United States Patent [19]

Terao et al.

[11] Patent Number: 5,245,684
[45] Date of Patent: Sep. 14, 1993

[54] OPTICAL FIBER ASSEMBLY, METHOD OF MANUFACTURING THE SAME AND OPTICAL FIBER ASSEMBLY CONNECTION USING THE SAME

[75] Inventors: Kazuhiko Terao, Komoro; Takeyasu Nakayama, Chiisagata, both of Japan

[73] Assignee: Totoku Electric Co., Ltd., Tokyo, Japan

[21] Appl. No.: 930,108

[22] Filed: Aug. 13, 1992

[30] Foreign Application Priority Data

Aug. 23, 1991 [JP] Japan ................... 3-211992
Jun. 30, 1992 [JP] Japan ................... 4-171419

[51] Int. Cl.$^5$ .......................... G02B 6/00; G02B 6/36
[52] U.S. Cl. ................................ 385/78; 385/85
[58] Field of Search ................. 385/75, 76, 77, 78, 385/85, 86

[56] References Cited

U.S. PATENT DOCUMENTS

| | | | |
|---|---|---|---|
| 4,217,029 | 8/1980 | Kao | 385/78 X |
| 4,729,624 | 3/1988 | Kakii et al. | 385/78 |
| 4,787,698 | 11/1988 | Lyons et al. | 385/85 X |
| 4,850,664 | 7/1989 | Iri et al. | 385/78 X |
| 4,875,755 | 10/1989 | Borgos et al. | 385/78 |
| 5,062,682 | 11/1991 | Marazzi | 385/78 X |
| 5,071,218 | 12/1991 | Nishimoto | 385/78 X |
| 5,082,378 | 1/1992 | Muller et al. | 385/85 X |
| 5,140,660 | 8/1992 | Takahashi | 385/78 X |

FOREIGN PATENT DOCUMENTS

| | | |
|---|---|---|
| 9102994 | 3/1991 | European Pat. Off. . |
| 61-142063 | 6/1986 | Japan . |
| 62-034762 | 2/1987 | Japan . |
| 1-121805 | 5/1989 | Japan . |
| 2-033114 | 2/1990 | Japan . |

Primary Examiner—Akm E. Ullah
Attorney, Agent, or Firm—Jordan and Hamburg

[57] ABSTRACT

An optical fiber assembly is disclosed, which permits reduction of light reflection, suppression of reflected return light and reduction of connection loss and also facilitates its manufacture. The optical fiber assembly 10 comprises an optical fiber 18 and a ferrule 12 with an end taper and mounted on an end portion of the optical fiber. The end face of the optical fiber 18 and the end face of the ferrule 12 are constituted by a convex spherical surface S1 with the center P0 thereof at a position spaced apart from the center line L0 of the optical fiber 18. The radial line L1 passing through the center P1 of the optical fiber and the center P0 makes an angle $\theta'$ of 6 to 12 degrees with respect to the center line L0, the radius of curvature is 50 to 70 mm, and the symmetricity angle $\Delta\theta$ is 0.1 degree or less.

7 Claims, 12 Drawing Sheets

FIG. 16 ic fiber assembly, methods of manufacturing the same and optical fiber assembly connections using the same and, more particularly, to optical fiber assemblies, methods of manufacturing the same and optical fiber assembly connections using the same, which can reduce light reflection, suppress reflected return light and reduce connection loss as well as facilitating manufacture.

OPTICAL FIBER ASSEMBLY, METHOD OF MANUFACTURING THE SAME AND OPTICAL FIBER ASSEMBLY CONNECTION USING THE SAME

BACKGROUND OF THE INVENTION

1. Field of the Invention

This invention relates to optical fiber assemblies, methods of manufacturing the same and optical fiber assembly connections using the same and, more particularly, to optical fiber assemblies, methods of manufacturing the same and optical fiber assembly connections using the same, which can reduce light reflection, suppress reflected return light and reduce connection loss as well as facilitating manufacture.

2. Description of the Prior Art

As optical fibers for light signal transmission, in many cases two optical fibers are connected together for use. The connected end of each optical fiber is covered by a ferrule for the purposes of the reinforcement and protection. According to the invention, an optical fiber covered by a ferrule is referred to as an optical fiber assembly.

Where two optical fiber assemblies are connected together, it is necessary to reduce light reflection and suppress reflected return light at each connection end face and reduce the connection loss.

Japanese Patent Application Laid-Open 121805/1989 shows an optical fiber assembly, in which the end face of the connection end of the optical fiber is formed into a convex spherical surface with the center thereof spaced apart from the center line of the optical fiber.

This optical fiber assembly permits reduction of light reflection and suppression of reflected return light.

However, with this prior art optical fiber assembly the light reflection is reduced only by about 50 dB in terms of the reflection attenuation (or reflection return loss). This order of reduction is not always satisfactory. Besides, there is no consideration about the reduction of the connection loss.

SUMMARY OF THE INVENTION

An object of the invention is to provide an optical fiber assembly, which can reduce light reflection, suppress reflected return light and reduce the connection loss, as well as facilitating manufacture.

Another object of the invention is to provide a method of manufacturing such optical fiber assembly.

A further object of the invention is to provide an optical fiber assembly connection using such optical fiber assemblies.

In a first aspect of the invention, there is provided an optical fiber assembly, which comprises an optical fiber and a ferrule with an end taper and mounted on an end portion of the optical fiber, the optical fiber and ferrule having their end faces constituting a convex spherical surface with the center thereof spaced apart from the center line of the optical fiber, a first radial straight line passing through the center of the optical fiber as an intersection between the convex spherical surface and the center line and the center of the convex spherical surface and making an angle $\theta'$ of 6 to 12 degrees with the center line, the radius of curvature is 50 to 70 mm, a second radial straight line passing through a point, at which a planar surface normal to a straight line at a desired value $\theta$ of the angle $\theta'$ with respect to the center line is in contact with the convex spherical surface, and the center of the convex spherical surface and at a symmetricity angle $\Delta\theta$ of 0.1 degree or less with respect to the first radial straight line.

In a second aspect of the invention, there is provided an optical fiber assembly, in which the convex spherical surface as noted above is formed on the optical fiber center side of a curved boundary line passing through an area up to 200 $\mu$m from the optical fiber center on the side of the center of the convex spherical surface, and a different convex spherical surface with the center thereof located on the center line of the optical fiber and a radius of curvature of 5 to 25 mm is formed on the other side of the curved boundary line.

In a third aspect of the invention, there is provided an optical fiber assembly, in which the convex spherical surface is formed on the optical fiber center side of a curved boundary line passing through an area up to 200 $\mu$m from the optical fiber center on the side of the center of the convex spherical surface, and a planar surface is formed on the other side of the curved boundary line.

In a fourth aspect of the invention, there is provided a method of manufacturing an optical fiber assembly, which comprises the steps of obtaining an eventual optical fiber assembly by mounting a ferrule with an end tape on an end portion of an optical fiber, forming the free end of the eventual optical fiber assembly with the planar surface as noted above in connection with the first aspect, normal to a straight line at a desired value $\theta$ of the angle $\theta'$ with respect to the center line, and forming the end of the eventual optical fiber assembly into the convex spherical surface as noted above in connection with the first aspect by causing relative movement of the eventual optical fiber assembly and a concave spherical polishing surface having the radius of curvature as noted above in connection with the first aspect with the end of the eventual optical fiber assembly held urged against the polishing surface while maintaining the desired value $\theta$ as the angle between the radial line of the polishing surface and the center line of optical fiber in the end portion thereof.

In a fifth aspect of the invention, there is provided a method of manufacturing an optical fiber assembly, which comprises the steps of obtaining an eventual optical fiber assembly by mounting a ferrule with an end taper on an end portion of an optical fiber, forming the free end of the eventual optical fiber assembly with a convex spherical surface with the center thereof located on the center line of the optical fiber and a radius of curvature of 5 to 25 mm, determining a curved boundary line passing through an area of up to 200 $\mu$m from the center of the optical fiber, and forming the convex spherical surface as noted above in connection with the first aspect on the optical fiber center side of the curved boundary line by causing relative movement of the eventual optical fiber assembly and a concave spherical polishing surface with the radius of curvature as noted above with the optical fiber center side of the curved boundary line held urged against the polishing surface while maintaining the desired value $\theta$ of the angle between the radial line of the polishing surface and the center line of the optical fiber in the end portion thereof.

In a sixth aspect of the invention, there is provided a method of manufacturing an optical fiber assembly, which comprises the steps of obtaining an eventual optical fiber assembly by mounting a ferrule with an end taper on an end portion of an optical fiber, forming the free end of the eventual optical fiber assembly into a planar surface substantially normal to the center line of the optical fiber, determining a boundary line passing through an area up to 200 μm from the center line of the optical fiber, forming the optical fiber center side of the boundary line into an inclined planar surface at a desired value θ of the angle θ' as noted above in connection with the first aspect, and forming the convex spherical surface as noted above in connection with the first aspect, and forming the inclined planar surface into the convex spherical surface as noted above in connection with the first aspect by causing relative movement of the eventual optical fiber assembly and a convex spherical polishing surface with the radius of curvature as noted above in connection with the first aspect with the inclined planar surface held urged against the polishing surface while maintaining the desired value θ as the angle between the radial line of the polishing surface and the center line of the optical fiber in the end portion thereof.

In a seventh aspect of the invention, there is provided an optical fiber assembly connection, which comprises a pair of optical fiber assemblies as noted above in connection with the first aspect, the pair optical fiber assemblies being abutted end to end such that the center lines of their convex spherical surfaces are on the opposite sides of the center line of their optical fibers, and a sleeve, the abutted pair optical fiber assemblies being inserted in the sleeve, the sleeve having a slit extending at an angle of 7 to 15 degrees with respect to its longitudinal direction.

With the optical fiber assembly according to the invention, in which the first radial straight line passing through the center of the optical fiber and the center of the convex spherical surfaces makes an angle θ' of 6 degrees or more with respect to the center line of the optical fiber, the reflected light is mostly emitted to the outside of the optical fiber. It is thus possible to suppress the reflected return light. In addition, since the angle θ' is not greater than 12 degrees, when connecting a pair of optical fiber assemblies by abutting them end to end, the deviation of the center lines of the two optical fiber assemblies due to the abutting force may be held within a slight extent. It is thus possible to reduce light reflection and also reduce the connection loss. Further, since the convex spherical surface has a radius of curvature of 50 mm or more, the symmetricity angle Δθ may be readily made to be 0.1 degree or less. With a symmetricity angle Δθ of 0.1 degree or less, the point of contact between the two abutted optical fiber assemblies is deviated only slightly from the optical fiber center, thus permitting reduction of the light reflection and connection loss. Further, since the radius of curvature of the convex spherical surface is 70 mm or less, it is possible to reduce the time of manufacture in view of the size of the convex spherical surface. Further, since the ferrule has an end taper, the area to be polished is reduced, thus facilitating the manufacture.

Further, where the end of the optical fiber assembly has a portion constituted by a convex spherical surface with the center thereof spaced apart from the center line of the optical fiber, the remainder being constituted by a different convex spherical surface with the center thereof on the optical fiber center line, it is possible to improve the accuracy of manufacture and the quality of the product by forming the convex spherical surface with the center thereof on the optical fiber center line prior to the formation the convex spherical surface with the center thereof spaced apart from the optical fiber center line.

Further, similar effects can be obtained with an optical fiber assembly, the end of which has a portion constituted by a convex spherical surface and the remainder by a planar surface.

In the method of manufacturing an optical fiber assembly according to the invention, since the ferrule has an end taper, the area to be polished is reduced. In addition, since the end of the eventual optical fiber assembly with the end thereof formed into a planar surface inclined by the desired value of the angle θ' noted above is polished while maintaining the desired value θ with respect to the radial line of the convex spherical polishing surface having the radius of curvature as noted above, the extent of polishing is reduced, thus permitting reduction of time for forming the convex spherical surface as noted above.

Further, in the method of manufacturing an optical fiber assembly, in which the end of the optical fiber assembly is formed formed with the convex spherical surface with the center thereof on the optical fiber center line and then formed with the convex spherical surface with the center thereof spaced apart from the optical fiber center line, it is possible to avoid application of impartial force to the end of the eventual optical fiber assembly during polishing to form the convex spherical surface with the center thereof deviated from the optical fiber center line. It is this possible to improve the accuracy of manufacture.

Further, this method of manufacturing an optical fiber assembly permits reduction of the extent of polishing and the time required for forming the convex spherical surface.

Further, with the optical fiber assembly connection according to the invention, the slit of the sleeve is inclined by 7 degrees or more with respect to the longitudinal direction of the sleeve. Thus, compared to the case of absence of any inclination angle, it is possible to provide a greater force of holding the pair optical fiber assemblies. The two abutted optical fiber assemblies tend to be deviated by the abutting force. However, the deviation is suppressed by the holding force provided by the sleeve. It is thus possible to reduce light reflection and connection loss. Further, where a sleeve with an inclined slit is used, it is possible to reduce fluctuations of the reflection and connection loss that occur at the time of mounting and demounting depending on the position of the slit. The holding force may be increased by increasing the inclination angle of the slit. In view of the readiness of manufacture, however, the inclination angle is suitably 15 degrees or less.

DETAILED DESCRIPTION OF THE PREFERRED EMBODIMENTS

The invention will be described hereinafter in greater detail in conjunction with illustrated embodiments thereof without any sense of limitation.

Figure 1:
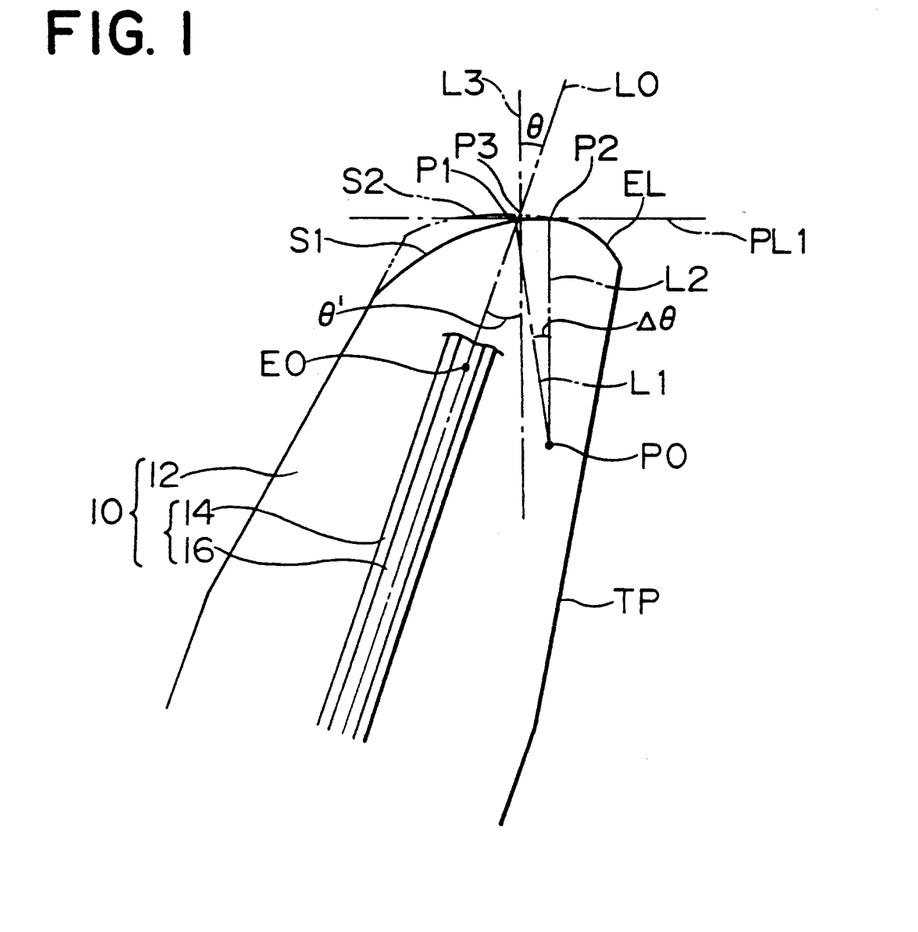
FIG. 1 is a fragmentary longitudinal sectional view showing an essential part of an embodiment of the optical fiber assembly according to the invention.
Figure 2:
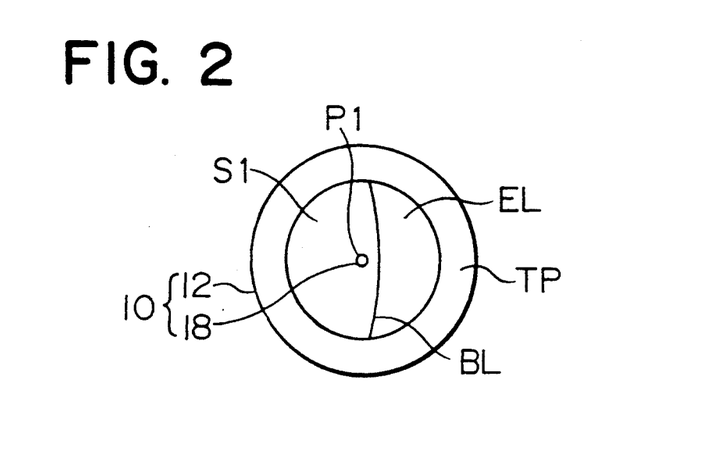
FIG. 2 is a top view showing the free end of the optical fiber assembly shown in FIG. 1.

FIG. 1 is a longitudinal sectional view showing an embodiment of the optical fiber assembly 10 according to the invention, and FIG. 2 is a view showing the free end of the assembly.

The illustrated optical fiber assembly 10 comprises a ferrule 12 and an optical fiber 18. The optical fiber 18 includes an optical fiber core 16 and an optical fiber clad layer 14 covering the core. The ferrule 12 is mounted on an end portion of the optical fiber 18, and it has an end taper. As an example, the optical fiber assembly 10 has a diameter of 2.5 mm, and the taper TP has a taper angle of 30 degrees and a length of 1.3 mm.

The free end of the optical fiber assembly 10 has a portion constituted by a convex spherical surface S1 and the remainder constituted by a convex surface EL with the center EO thereof located on the center line L0 of the optical fiber 18. The boundary line BL between the convex spherical surfaces S1 and EL is a curved line as shown in FIG. 2 and passes through an area in a range of 200 μm from the center P1 of the optical fiber.

Shown by a phantom line is a desired convex spherical surface S2. The center of the convex surface S2 is located on a straight line L3, which passes through an intersection point P3 between the center line L0 of the optical fiber 18 and the convex spherical surface S2 and is at a design angle θ with respect to the center line L0.

The center P0 of the actually manufactured convex spherical surface S1, however, is slightly deviated from the straight line L3 noted above. A straight line, which passes through the center point P1 of the optical fiber as an intersection between the center line L0 and the convex spherical surface S1 and also through the center P0, is referred to as a first radial straight line L1. A straight line, which passes through a point P2 of contact between a plane PL1 normal to the straight line L3 and the convex spherical surface P2 and also through the cente P0, is referred to as a second radial straight line L2. The angle between the two radial straight lines L1 and L2 is referred to as symmetricity angle Δθ. In other words, the symmetricity angle Δθ is the difference between the angle θ' between the center line L0 and first radial straight line L1 and the desired angle θ.

The angle θ' indicates the direction by the convex spherical surface S1 by optical signal transmitted through the optical fiber 18. Thus, if the angle θ' is too small, total reflection takes place at the interface between the optical fiber core 16 and optical fiber clad layer 14 to increase the amount of reflected return light. If the angle θ' is too large, on the other hand, deviation of the center lines of paired optical fiber assemblies 10 is liable when connecting the assemblies. For the above reasons, the angle θ' is set to be 6 degrees or more and 12 degrees or less.

The distance L between the points P1 and P2 should be made the smaller the smaller the radius of curvature. In view of the accuracy and the number of steps of manufacture, however, it is suitable to set the radius of curvature to be in a range of 50 to 70 mm and set the symmetricity angle Δθ to be 0.1 degree or less.

To obtain the convex spherical surface S1 by accurate polishing, the convex spherical surface EL is formed preliminarily by rubbing the optical fiber assembly 10 against a rubber or like elastic member. The radius of curvature is suitably in a range of 5 to 25 mm.

Figure 3:
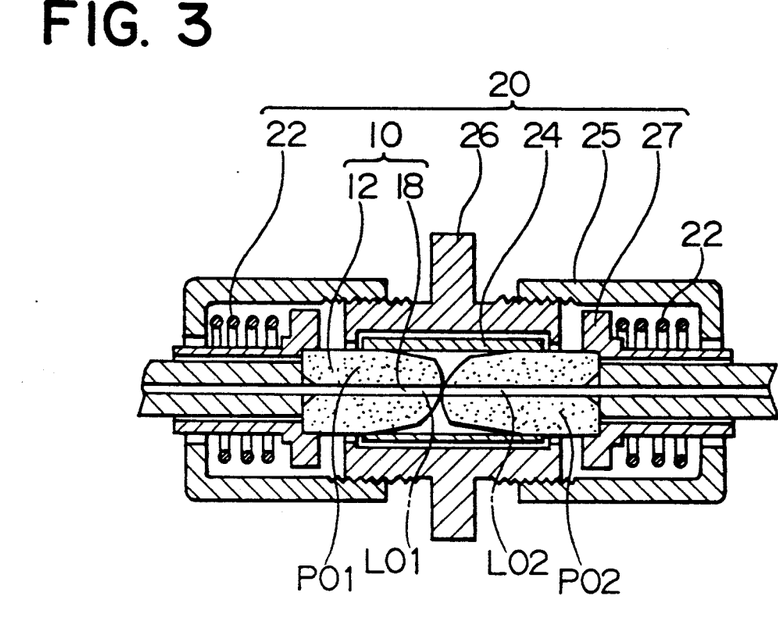
FIG. 3 is a longitudinal sectional view showing an essential part of an embodiment of the optical fiber assembly connection according to the invention.

FIG. 3 shows an optical fiber assembly connection 20 comprising a pair of optical fiber assemblies 10 connected to each other.

As shown, the paired optical fiber assemblies 10 are disposed such that the centers P01 and P02 of their respective convex spherical surfaces are found on the opposite sides of their aligned center line L01 and L02.

The paired optical fiber assemblies 10 are inserted in a sleeve 24 with an inclined slit. The sleeve 24 is accommodated in an adopter 26.

Paired coupling nuts 25 are screwed on the adopter 26.

Each optical fiber assembly 10 is inserted in a cylindrical member 27.

Each cylindrical member 27 is spring biased by a coil spring 22 to urge the associated ferrule 12 to have the paired optical fiber assemblies 10 in close contact with each other. Each coil spring 22 is accommodated in the associated coupling nut 25. By making the coupling nut 25 the coil spring 22 is compressed to generate a biasing force.

Figure 4:
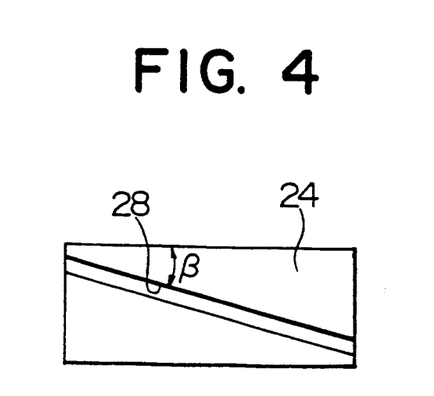
FIG. 4 is a plan view showing a sleeve with a slit.

By making the coupling nuts 25, the paired optical fiber assemblies 10 are brought into contact with each other at the point of contact between their convex spherical surfaces by the biasing forces of the coil springs 22. However, the biasing forces are applied in the directions of the center lines L01 and L02 of the paired optical fiber assemblies 10, and these directions are not identical with the directions of normals to the convex spherical surfaces at the point of contact. Therefore, the individual optical fiber assemblies receive forces applied in directions to cause a deviation of the center lines L01 and L02. In order to minimize this deviation, the sleeve 24 is formed with an inclined slit 28. More specifically, as shown in FIG. 4, the slit 28 of the sleeve 24 is inclined by an angle β with respect to the longitudinal direction of the sleeve 24. This angle β is selected to be in a range of 7 to 15 degrees.

By providing the inclined slit 28, the force of holding the optical fiber assemblies 10 can be increased compared to the case of provision of a slit which is not inclined. Thus, the deviation of the center lines L01 and L02 of the paired optical fiber assemblies can be reduced to reduce the amount of light reflection and connection loss.

The connection loss is expressed as $$CL = -10 \cdot ln(PP/PT)$$

where PT represents the incident light power of optical signal on one of the optical fibers, and PP represents the emergent light power of the optical signal from the other optical fiber.

The connection loss CL was measured repeatedly in a case in which the angle β was 10 degrees and also in a case without any inclination angle. It was found to be 0.2 to 0.3 dB in the former case and 0.2 to 0.6 dB in the latter case. In the average, it was 0.25 dB in the former and 0.35 dB in the latter, that is, it was smaller in the former case. Thus, it will be seen that by providing the inclined slit 28 it is possible to reduce the connection loss and fluctuations thereof in repeated measurement.

The upper limit of the angle β is set to 15 degrees in view of facilitation of the formation of the slit 28.

Now, the method of manufacturing the optical fiber assembly will be described with reference to FIGS. 5 to 8.

Figure 5:
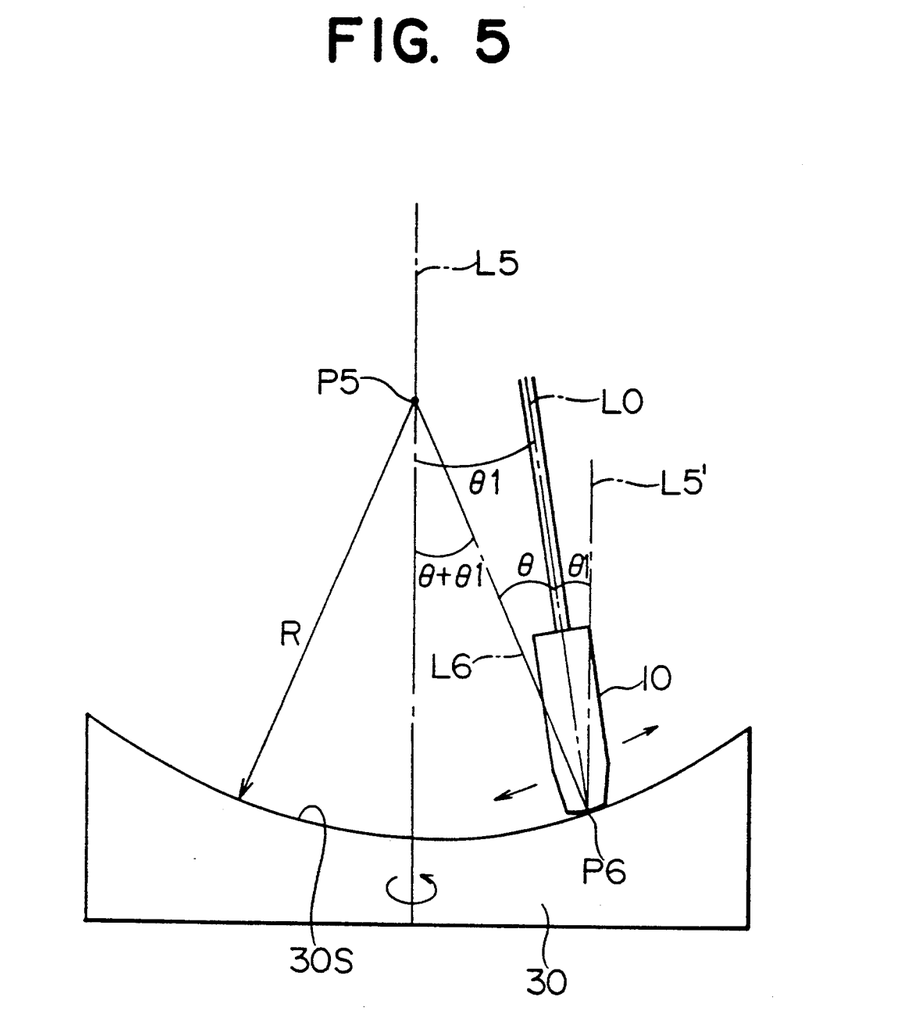
FIG. 5 is a view for explaining an embodiment of the method of manufacturing an optical fiber assembly according to the invention.

First, an eventual optical fiber assembly 10 is formed by mounting the ferrule 12 with an end taper on the optical fiber 18.

Then, the convex spherical surface EL is formed at the free end of the eventual optical fiber assembly 10 by holding the end urged perpendicularly against a rubber or like elastic member and causing rotation thereof about an axis aligned to the center line L0 of the assembly 10.

Then, a portion of the convex spherical surface EL is formed into the convex spherical surface S1.

FIG. 5 illustrates a method of polishing to form a portion of the convex spherical surface EL into the convex spherical surface S1.

First, the convex spherical surface EL at the end of the eventual optical fiber assembly 10 is urged against a polishing surface 30S of a polishing disk 30 at a predetermined position P6 of the surface 30S, the surface 30S having a predetermined radius R of curvature. At this time, the position P6 is at an angle of $\theta + \theta_1$ with respect the axis L5 of rotation of the polishing disk 30 passing through the center P5 of the polishing surface 30 S. The eventual optical fiber assembly 10 is held such that its center line L0 is at an angle of $\theta_1$ with respect to the axis L5 of rotation noted above. Since the end of the optical fiber assembly 10 constitutes the convex spherical surface EL, it is urged with force having less partial force component against the polishing surface 30S, thus resulting in less accuracy error.

It is desired to use the entire area of the polishing surface 30S uniformly. Accordingly, the polishing operation is performed by changing the position P6 in the directions of arrows while maintaining the angle relation as described above.

Figure 6:
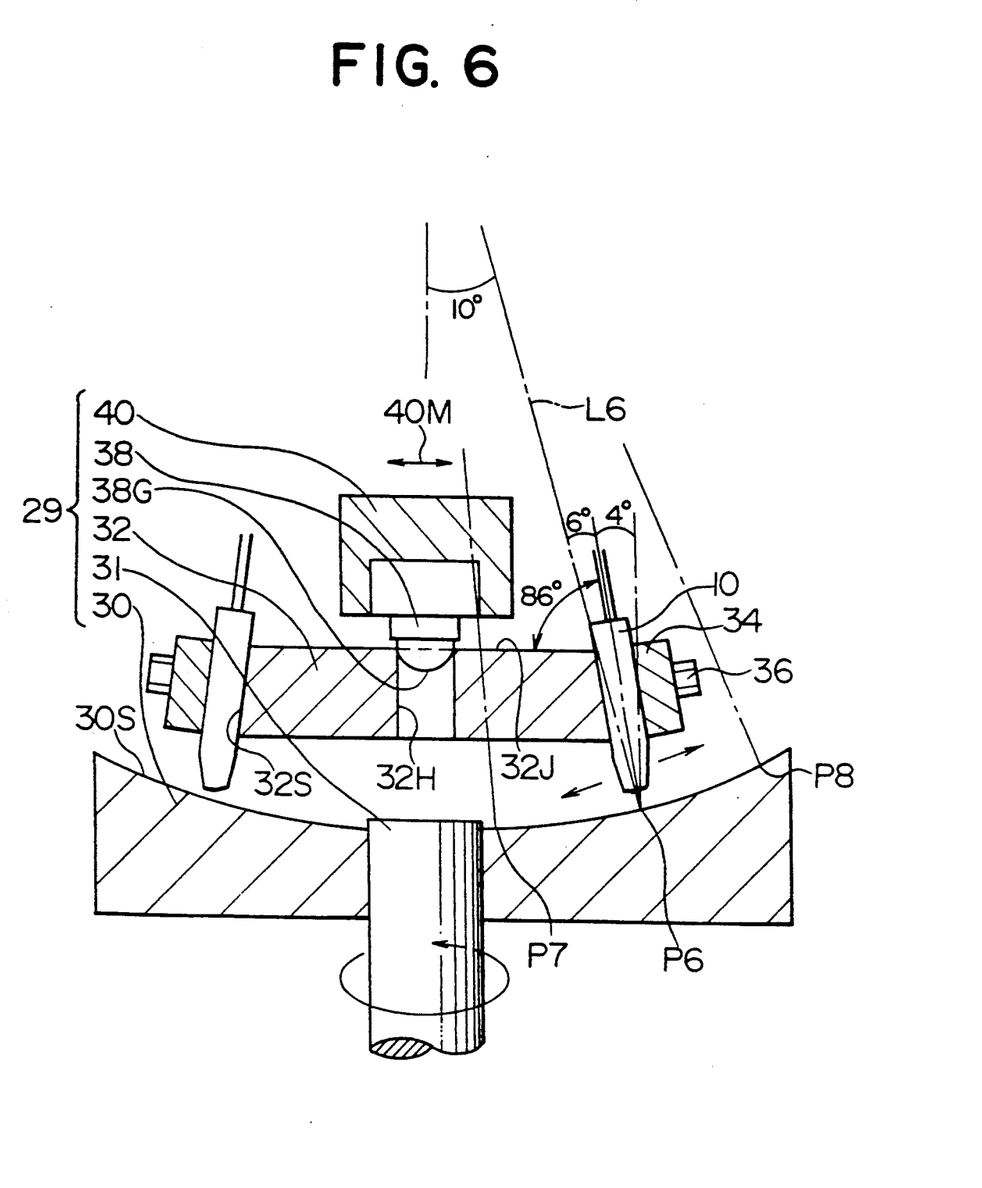
FIG. 6 is a sectional view showing a polishing apparatus.

FIG. 6 is a sectional view showing a polishing apparatus 29 for carrying out the above polishing method. The Figure shows a case, in which the inclination angle $\theta$ in FIG. 5 is 6 degrees, the position P6 is at an angle of 10 degrees with respect to the center line and the angle $\theta_1$ is 4 degrees.

A shaft 31 rotates the polishing disk 30. Designated at 32 is a mounting member having a frustconical sectional profile. When the member 32 is at its center position as shown, the eventual optical fiber assembly 10 secured to the member 32 by a securement member 32 and a set screw member 36 and urged against the polishing surface 30S, is found at position P6 at an angle of 10 degrees with respect to the center line. Thus, the side 32S of the eventual optical fiber assembly 10 as a mounding surface is at an angle $\theta$ of 86 degrees with respect to the top 32J of the mounting member 32.

The mounting member 32 has a central cylindrical hole 32H. Inserted in this cylindrical hole 32H is a half-spherical end portion 38G of a drive member 38 held by an arm 40. The mounting member 32 is rotatable about the half-spherical portion 38G. As shown, two eventual optical fiber assemblies 10 secured to the mounting member 32 have their end faces urged against the polishing surface 30S at position P6 thereof by the weights of the mounting member 32, drive member 38 and arm 40. (The end faces of the eventual optical fiber assemblies 10 are shown separated from the polishing surface 30S to facilitate understanding.)

Each eventual optical fiber assembly 10 in this state is reciprocated along the polishing surface 30S between positions P7 and P8 by causing rocking of the arm 40 in the directions of arrows 40M in a manner as will be described. The mounting member 32 is rotated about the half-spherical portion 38G of the drive member 38 while maintaining the angle $\theta$ at 6 degrees. During the polishing operation, the polishing disk 30 is also rotated by the shaft 31.

Figure 7:
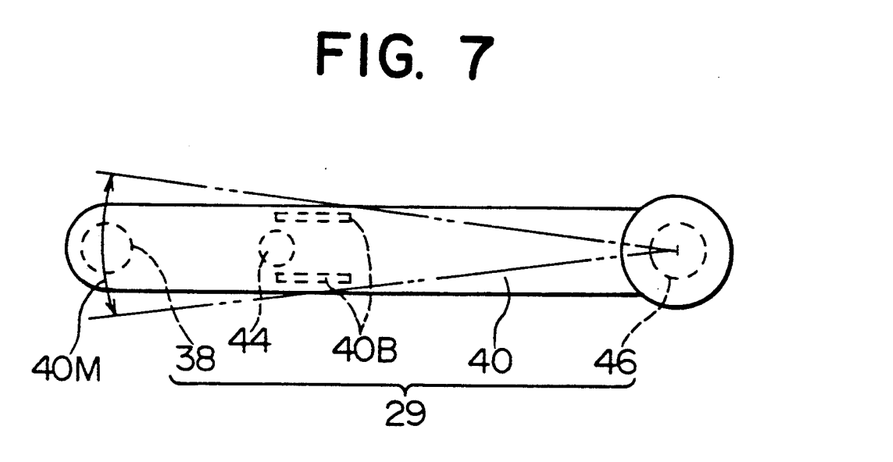
FIG. 7 is a plan view showing a rocking mechanism in the polishing apparatus shown in FIG. 6.
Figure 8:
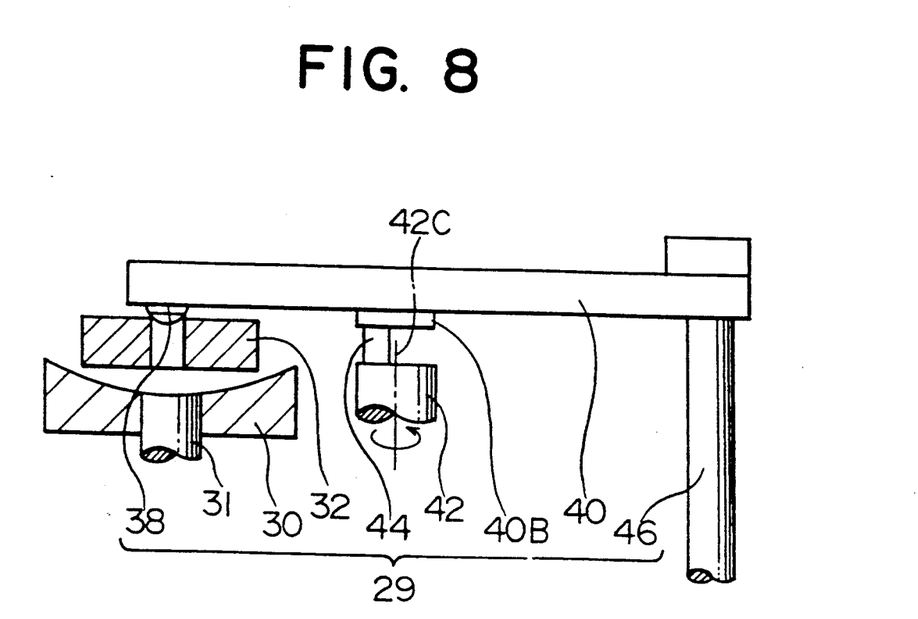
FIG. 8 is a side view showing the rocking mechanism in the polishing apparatus shown in FIG. 6.

FIGS. 7 and 8 illustrate a mechanism for causing rocking of the arm 40. More specifically, FIG. 7 is a plan view showing the polishing apparatus 29, and FIG. 8 is a side view showing the same.

The arm 40 is mounted on a support shaft 46, which is rotatable. The arm 40 has two toothed members 40B secured nearly to its central portion. Underneath the toothed members 40B a drive shaft 42 extends upright. A cylindrical member 44 is secured to the upper end of the drive shaft 42 at a position excentric to the center line 42C of the drive shaft 42. The cylindrical member 42 is found between the two toothed members 40B, and with the rotation of the drive shaft 42 it is brought into contact with each of the toothed members 40B, thus causing rocking of the arm 40 as shown in FIGS. 5 and 6.

Figure 10:
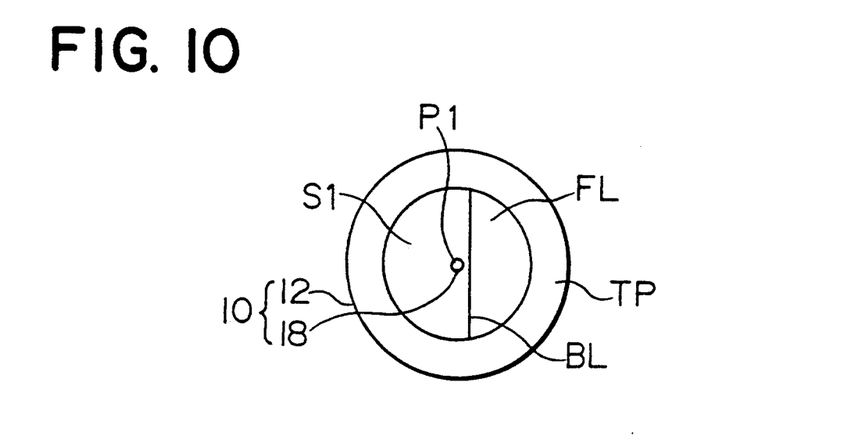
FIG. 10 is a top view showing the free end of the optical fiber assembly shown in FIG. 9.

In the method of manufacture as described above, optical fiber assemblies can be manufactured accurately and efficiently, and FIG. 10 is a view showing the free end of the assembly.

Figure 9:
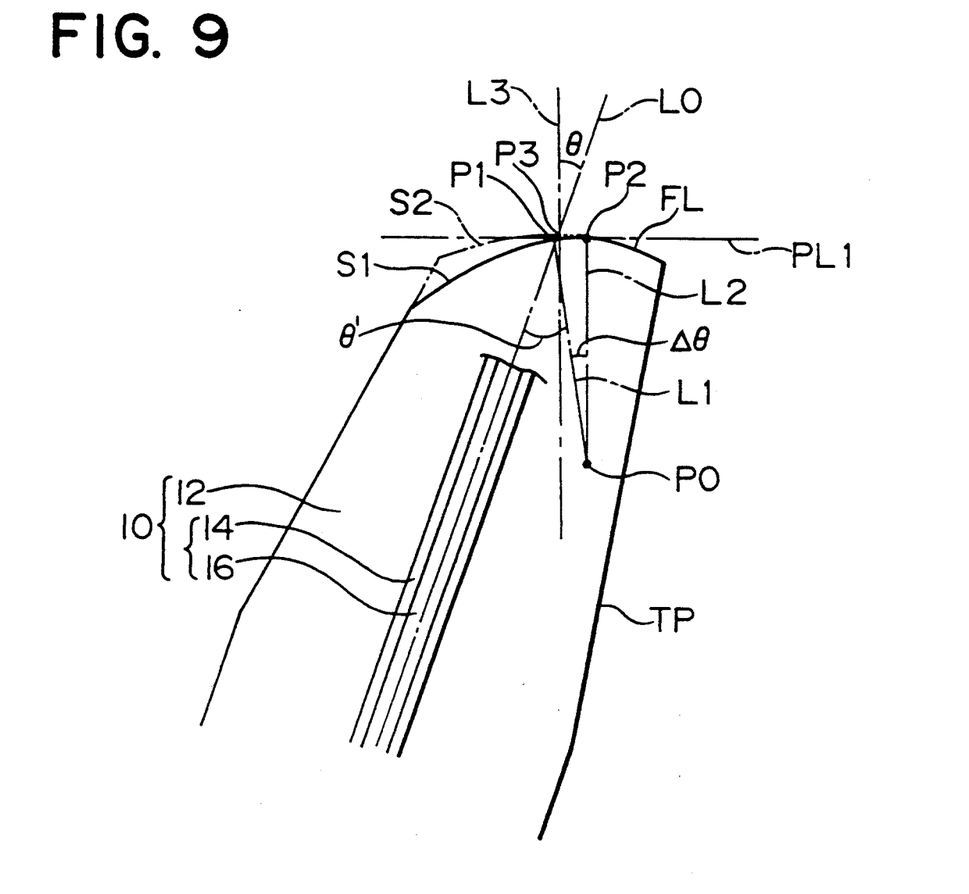
FIG. 9 is a fragmentary longitudinal sectional view showing an essential part of a different embodiment of the optical fiber assembly according to the invention.

FIG. 9 is a longitudinal sectional view showing a different embodiment of the optical fiber assembly 10 according to the invention. FIG. 10 is a view showing the free end of the optical fiber assembly.

The free end of the optical fiber assembly 10 has a portion constituted by a convex spherical surface S1 and the remainder constituted by a planar surface FL normal to the center line L0 of the optical fiber 18. The boundary line between the convex spherical surface S1 and planar surface FL passes through an area in a range of 200 μm from the center P1 of the optical fiber.

Thus, this embodiment has the same structure as the previous embodiment shown in FIG. 1 except for that the convex spherical surface EL in the previous embodiment is replaced with the planar surface FL.

The presence of the planar surface FL at the end of the optical fiber assembly 10 contributes to reducing the deviation of the center lines L01 and L02 of paired optical fiber assemblies (FIG. 3).

Now, a method of manufacturing the above optical fiber assembly will be described with reference to FIGS. 11 and 12.

First, an eventual optical fiber assembly 10 is formed by mounting the ferrule 12 with an end taper on the optical fiber 18.

Then, the end of the eventual optical fiber assembly is polished to a planar surface normal to the center line L0 of the optical fiber 18.

Then, a portion of the end of the eventual optical fiber assembly 10 is polished into a planar surface at a design angle θ with respect to the center line L0 of the optical fiber in the end portion thereof.

Then, a portion of the inclined planar surface is formed into a convex spherical surface.

Figure 11:
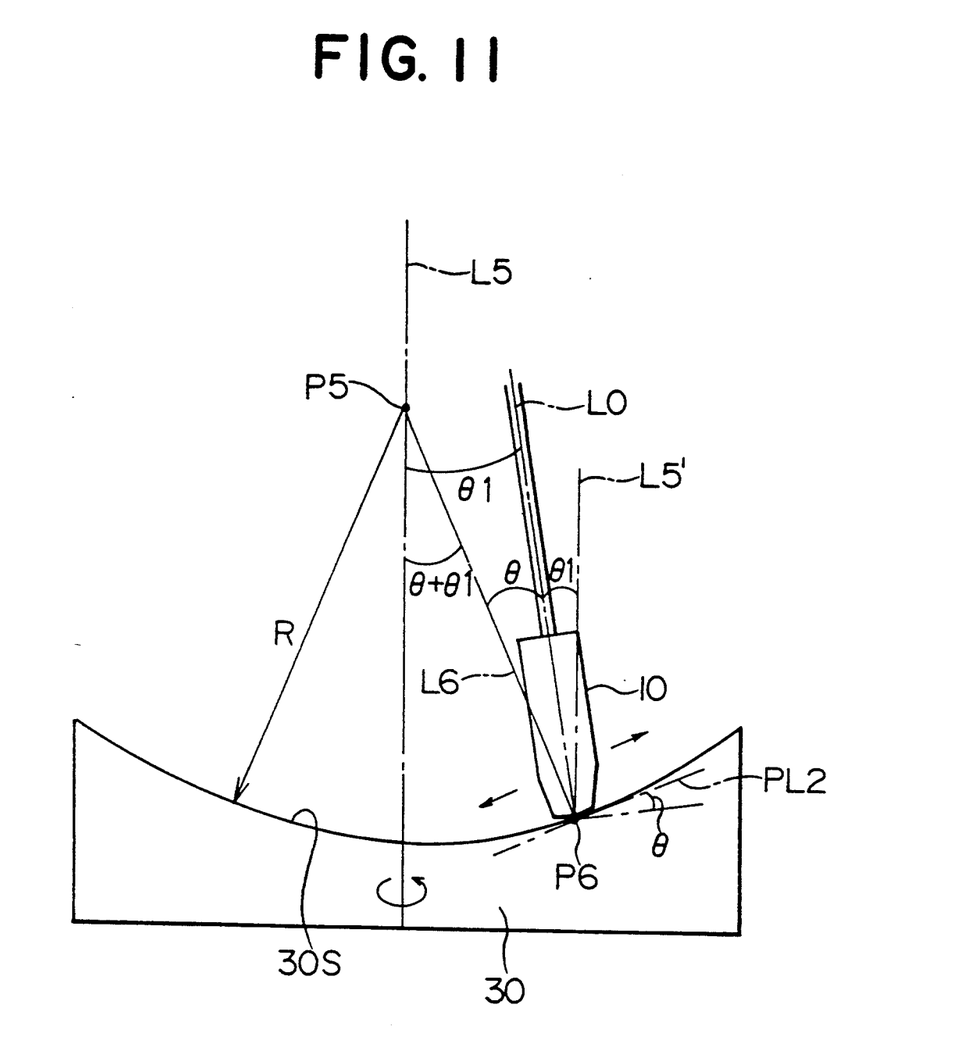
FIG. 11 is a view for explaining a different embodiment of the method of manufacturing an optical fiber assembly according to the invention.

FIG. 11 is a view illustrating a method of polishing the inclined planar surface into a convex spherical surface.

First, the inclined planar surface of the end of the eventual optical fiber assembly is urged against a polishing surface 30S of a polishing disk 30 at a predetermined position P6 of the surface 30S, the surface 30S having a predetermined radius R of curvature. At this time, the position P6 is at an angle of θ+θ1 with respect to the axis L5 of rotation of the polishing disk 30 passing through the center P5 of the polishing surface 30S. The eventual optical fiber assembly 10 is held such that its center line L0 is at an angle of θ1 with respect to the axis L5 of rotation noted above. Thus, the inclined planar surface is held parallel to the tangential plane PL2 to the polishing surface 30S at the position P6 thereof and urged against the polishing surface 30S.

It is desired to use the entire area of the polishing surface 30S uniformly. Accordingly, the polishing operation is performed by changing the position P6 in the directions of arrows while maintaining the angle relation described above.

Figure 12:
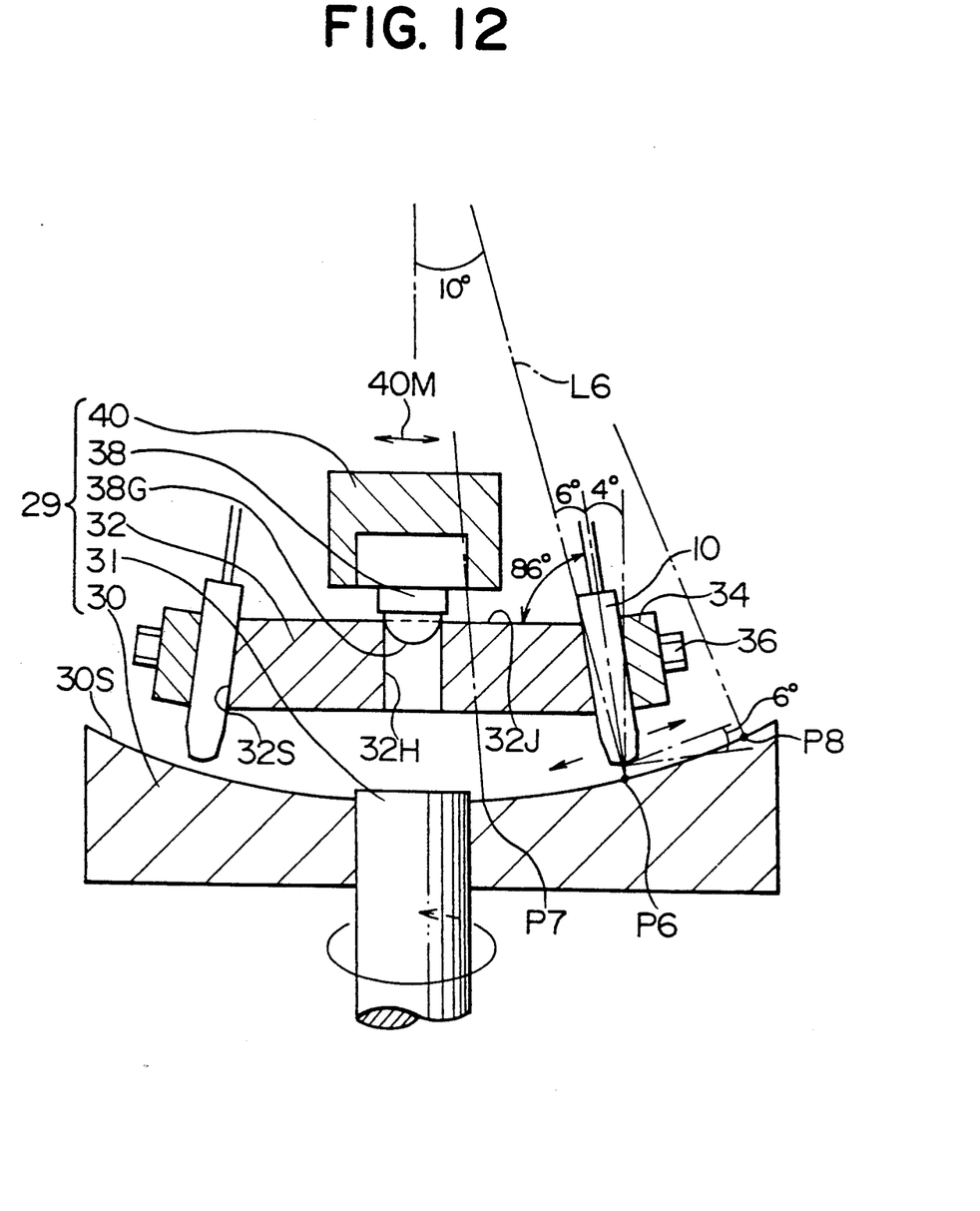
FIG. 12 is a sectional view showing a polishing apparatus.

FIG. 12 is a sectional view showing a polishing apparatus 29 for carrying out the above polishing method. The Figure shows a case, in which the inclination angle θ in FIG. 11 is 6 degrees, the position P6 is at an angle of 10 degrees with respect to the center line and the angle θ1 is 4 degrees.

The shaft 31 rotates the polishing disk 30. The mounting member 32 has a frustconical sectional profile. When the member 32 is at its center position as shown, the eventual optical fiber assembly 10 secured to the member 32 by a securement member 32 and a set screw member 36 and urged against the polishing surface 30S, is found at position P6 at an angle of 10 degrees with respect to the center line. Thus, the side 32S of the eventual optical fiber assembly 10 as a mounting surface is at an angle θ of 86 degrees with respect to the top 32J of the mounting member 32.

The mounting member 32 has a central cylindrical hole 32H. Inserted in this cylindrical hole 32H is a half-spherical end portion 38G of a drive member 38 held by an arm 40. The mounting member 32 is rotatable about the half-spherical portion 38G. As shown, two eventual optical fiber assemblies 10 secured to the mounting member 32 have their end faces urged against the polishing surface 30S at position P6 thereof by the weights of the mounting member 32, drive member 38 and arm 40. (The end faces of the eventual optical fiber assemblies 10 are shown separated from the polishing surface 30S to facilitate understanding.)

Each eventual optical fiber assembly 10 in this state is reciprocated along the polishing surface 30S between positions P7 and P8 by causing rocking of the arm 40 in the directions of arrows 40M in a manner as will be described. The mounting member 32 is rotated about the half-spherical portion 38G of the drive member 38 while maintaining the angle at 6 degrees. During the polishing operation, the polishing disk 30 is also rotated by the shaft 31.

MANUFACTURE EXAMPLE 1

A single mode optical fiber (for $\lambda = 1.3$ μm) was inserted into a ferrule with an end taper with a taper angle of 30 degrees from a barrel portion with a diameter of 2.5 mm to the end with a diameter of 1.2 mm. The optical fiber and ferrule were bonded together and hardened.

Then, the end of this assembly was polished into a planar surface normal to the center line of the optical fiber. Further, the end was polished to obtain a planar surface at an inclination angle of 6 degrees. The boundary line between the normal planar surface and the planar surface at the inclination angle of 6 degrees was set to a position of 150 μm from the center of the optical fiber.

Then, the planar surface at the inclination angle of 6 degrees was polished into a convex spherical surface. The polishing was done with polishing particles applied to the polishing disk and in two steps, i.e., a coarse polishing step and a finish polishing step.

In this way, an optical fiber assembly could be obtained, which had an angle θ' of 6 degrees, a radius of curvature of 60 mm and a symmetricity angle Δθ of 0.1 degree or less.

Figure 13:
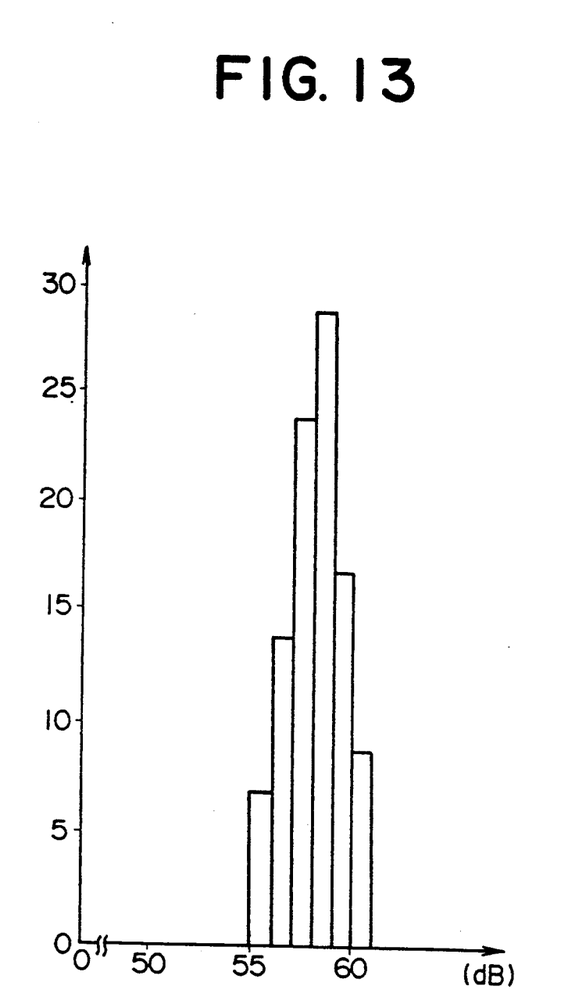
FIG. 13 is a graph showing a time number distribution obtained as a result of reflection attenuation measurement on optical fiber assembly samples obtained in Manufacture Example 1 according to the invention.

Reflective attenuation RL of this optical fiber assembly given as $$RL = -10 * ln(PR/PT)$$

PR: reflected light power of optical signal
PT: incident light power of optical signal
was measured to obtain results as shown in FIG. 13. The average value was 58.1 dB, and the standard deviation was 1.3 dB.

Afterwards, an optical fiber assembly connection was produced using two optical fiber assemblies as above and a sleeve with an angle β of 10 degrees and a holding force of 500 g.

Figure 14:
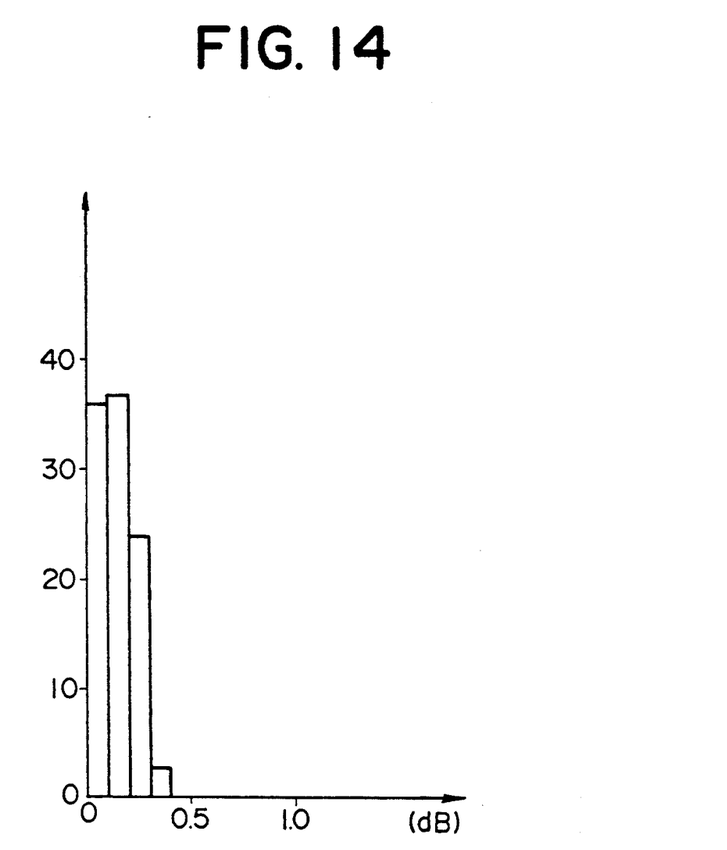
FIG. 14 is a graph showing a time number distribution obtained as a result of connection loss measurement on optical fiber assembly connection samples obtained in Manufacture Example 1.

The connection loss CL of this optical fiber assembly connection was measured to obtain results as shown in FIG. 14. The average value was 0.14 dB, and the standard deviation was 0.06 dB.

Further, the optical fiber assembly connection was repeatedly disassembled and reassembled, and its connection loss was measured every time it was disassembled and reassembled. The connection loss was stable with fluctuations of ±0.05 dB.

MANUFACTURE EXAMPLE 2

A single mode optical fiber (for $\lambda = 1.3$ μm) was inserted into a ferrule with an end taper with a taper angle of 30 degrees from a barrel portion with a diameter of 2.5 mm to the end with a diameter of 1.2 mm. The optical fiber and ferrule were bonded together and hardened.

Then, the end of this assembly was polished into a planar surface normal to the center line of the optical fiber. Further, the end was polished to obtain a planar surface at an inclination angle of 6 degrees. The boundary line between the normal planar surface and the planar surface at the inclination angle of 8 degrees was set to a position of 150 μm from the center of the optical fiber.

Then, the planar surface at the inclination angle of 8 degrees was polished into a convex sperical surface. The polishing was done with polishing particles applied to the polishing disk and in two steps, i.e., a coarse polishing step and a finish polishing step.

In this way, an optical fiber assembly could be obtained, which had an angle $\theta'$ of 8 degrees, a radius of curvature of 60 mm and a symmetricity angle $\Delta\theta$ of 0.1 degrees or less.

Figure 15:
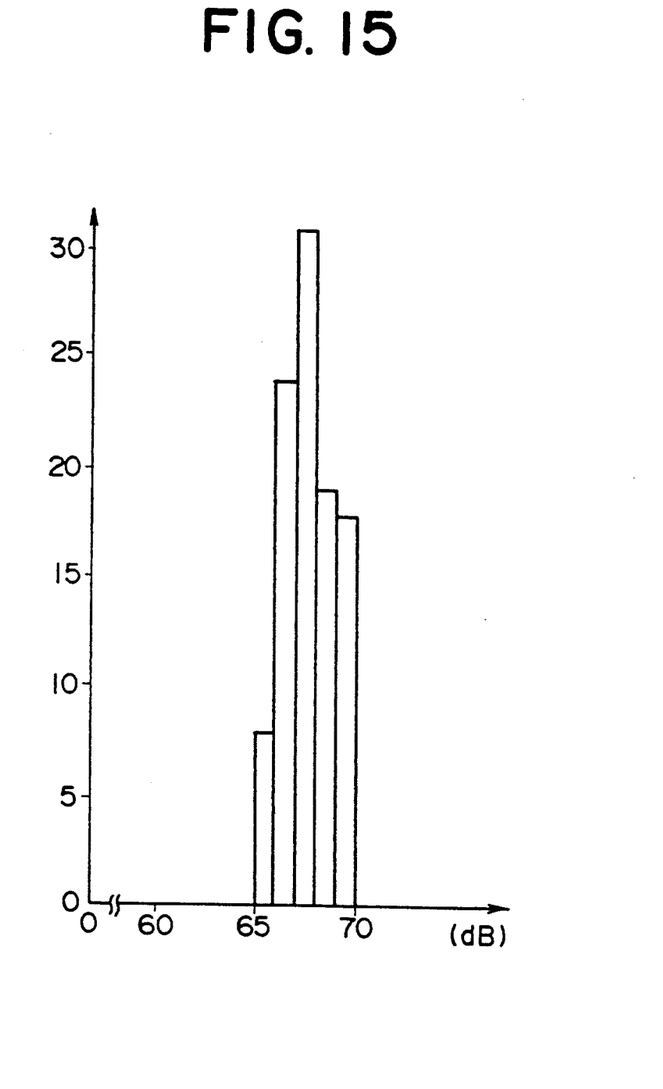
FIG. 15 is a graph showing a time number distribution obtained as a result of reflection attenuation measurement on optical fiber assembly samples obtained in Manufacture Example 2 according to the invention.

The reflective attenuation RL of this optical fiber assembly was measured to obtain results as shown in FIG. 15. The average value was 67.7 dB, and the standard deviation was 1.2 dB.

Afterwards, an optical fiber assembly connection was produced using two optical fiber aasemblies as above and a sleeve with an angle $\beta$ of 10 degrees and a holding force of 550 g.

Figure 16:
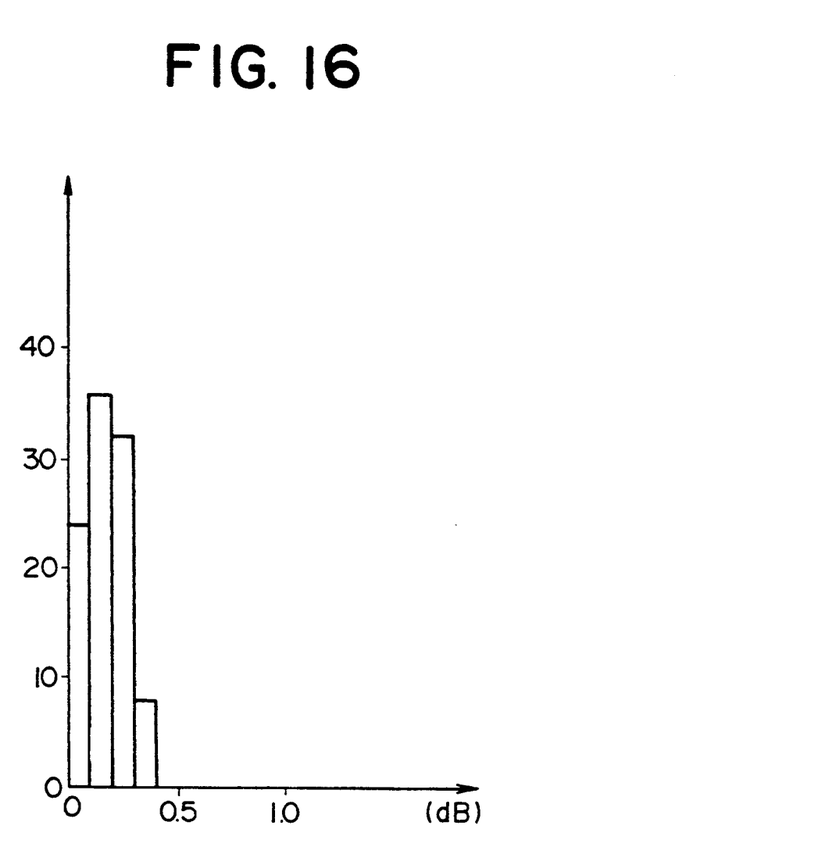
FIG. 16 is a graph showing a time number distribution obtained as a result of connection loss measurement on optical fiber assembly connection samples obtained in Manufacture Example 2.

The connection loss CL of 100 optical fiber assembly connection samples as above was measured to obtain results as shown in FIG. 16. The average value was 0.17 dB, and the standard deviation was 0.09 dB.

Further, the optical fiber assembly connections were repeatedly disassembled and reassembled, and their connection loss was measured every time they were disassembled and reassembled. The connection loss was stable with fluctuations of ±0.05 dB.

The optical fiber assembly according to the invention can reduce light reflection and suppress reflected return light. In addition, it can be readily manufactured.

Further, the method of manufacturing an optical fiber assembly according to the invention permits accurate and efficient manufacture of the optical fiber assembly.

Further, the optical fiber assembly connection according to the invention can reduce connection loss.

Thus, the invention is useful for optical switch directional couplers, optical amplifiers and so forth used for high speed signal transmission systems.

What is claimed is:

1. An optical fiber assembly comprising an optical fiber and a ferrule mounted on an end portion of said optical fiber, said ferrule having an end taper adjacent to a free end, the end face of said optical fiber and the end face of said ferrule constituting a convex spherical surface with the center thereof at a position spaced apart from the center line of said optical fiber, a first radial straight line passing through the center of the optical fiber as an intersection between said convex spherical surface and said center line and said center of said convex spherical surface and making an angle $\theta'$ of 6 to 12 degrees with said center line, the radius of curvature is 50 to 70 mm, a second radial straight line passing through a point, at which a planar surface normal to a straight line at a desired value $\theta$ of said angle $\theta'$ with respect to said center line is in contact with said convex spherical surface, and said center of said convex spherical surface and at a symmetricity angle $\Delta\theta$ of 0.1 degree or less with respect to said first radial straight line.

2. The optical fiber assembly according to claim 1, wherein said convex spherical surface is formed on the optical fiber center side of a curved boundary line passing through an area up to 200 μm from said optical fiber center on the side of said center of said convex spherical surface, and a different convex spherical surface with the center thereof located on said center line of said optical fiber and a radius of curvature of 5 to 25 mm is formed on the other side of said curved boundary line.

3. The optical fiber assembly according to claim 1, wherein said convex spherical surface is formed on the optical fiber center side of a curved boundary line passing through an area up to 200 μm from said optical fiber center on the side of said center of said convex spherical surface, and a planar surface is formed on the other side of said curved boundary line.

4. A method of manufacturing an optical fiber assembly comprising the steps of obtaining an eventual optical fiber assembly by mounting a ferrule with an end taper on an end portion of an optical fiber, forming the free end of said eventual optical fiber assembly with said planar surface as set forth in claim 1, normal to a straight line at a desired value $\theta$ of said angle $\theta'$ with respect to said center line, and forming the end of said eventual optical fiber assembly into said convex spherical surface as set forth in claim 1 by causing relative movement of said eventual optical fiber assembly and a concave spherical polishing surface having said radius of curvature as set forth in claim 1 with said end of said eventual optical fiber assembly held urged against said polishing surface while maintaining said desired value $\theta$ as the angle between the radial line of said polishing surface and the center line of optical fiber in said end portion thereof.

5. A method of manufacturing an optical fiber assembly comprising the steps of obtaining an eventual optical fiber assembly by mounting a ferrule with an end taper on an end portion of an optical fiber, forming the free end of said eventual optical fiber assembly with a convex spherical surface with the center thereof located on the center line of said optical fiber and a radius of curvature of 5 to 25 mm, determining a curved boundary line passing through an area of up to 200 μm from the center of said optical fiber, and forming said convex spherical surface as set forth in claim 1 on the optical fiber center side of said curved boundary line by causing relative movement of said eventual optical fiber assembly and a concave spherical polishing surface with said radius as set forth in claim 1 with the optical fiber center side of said curved boundary line held urged against said polishing surface while maintaining said desired value $\theta$ the angle between the radial line of said polishing surface and the center line of said optical fiber in said end portion thereof.

6. A method of manufacturing an optical fiber assembly comprising the steps of obtaining an eventual optical fiber assembly by mounting a ferrule with an end taper on an end portion of an optical fiber, forming the free end of said eventual optical fiber assembly into a planar surface substantially normal to the center line of said optical fiber, determining a boundary line passing through an area up to 200 μm from the center line of said optical fiber, forming the optical fiber center side of said boundary line into an inclined planar surface at a desired value $\theta$ of said angle $\theta'$ as set forth in claim 1, and forming said said convex spherical surface as set forth in claim 1, and forming said inclined planar surface into said convex spherical surface as set forth in claim 1 by causing relative movement of said eventual optical fiber assembly and a convex spherical polishing surface with said radius of curvature as set forth in claim 1 with said inclined planar surface held urged against said polishing surface while maintaining said desired value $\theta$ as the angle between the radial line of said polishing surface and the center line of said optical fiber in said end portion thereof.

7. An optical fiber assembly connection comprising a pair of optical fiber assemblies as set forth in one of claims 1 to 3, said pair optical fiber assemblies being abutted end to end such that the centers of their convex spherical surfaces are on the opposite sides of the center line of their optical fibers, and a sleeve, said abutted pair of optical fiber assemblies being inserted in said sleeve, said sleeve having a slit extending at an angle of 7 to 15 degrees with respect to its longitudinal direction.

* * * * *